(12) United States Patent
Cordia et al.

(10) Patent No.: US 6,245,174 B1
(45) Date of Patent: Jun. 12, 2001

(54) HEAT RECOVERABLE ARTICLE

(76) Inventors: Johannes Maria Cordia, Kerkweg 26, 3212 Pellenberg (BE); Robert Seidel, 233 North Garfield, Hindsale, IL (US) 60521; Robert Ritter, 42555 Fountainebleau Park La., Fremont, CA (US) 94538

(*) Notice: Subject to any disclaimer, the term of this patent is extended or adjusted under 35 U.S.C. 154(b) by 0 days.

(21) Appl. No.: 08/973,012
(22) PCT Filed: May 30, 1996
(86) PCT No.: PCT/GB96/01277
  § 371 Date: Nov. 26, 1997
  § 102(e) Date: Nov. 26, 1997
(87) PCT Pub. No.: WO96/38288
  PCT Pub. Date: Dec. 5, 1996

(30) Foreign Application Priority Data

May 31, 1995 (GB) .................................................. 9510953
Nov. 28, 1995 (GB) .................................................. 9524549

(51) Int. Cl.[7] ........................... B65B 53/00; B29C 41/00; B32B 31/26
(52) U.S. Cl. ........................... 156/160; 156/173; 156/85; 156/86; 264/230; 428/34.9; 174/DIG. 8
(58) Field of Search .................... 428/34.9, 35.1; 174/DIG. 8, 35 R, 84 R, 85; 156/84, 85, 86, 160, 244.13, 162, 173; 264/230, 494

(56) References Cited

U.S. PATENT DOCUMENTS 3,455,337   7/1969  Cook ..................................... 138/178
4,428,790 * 1/1984  Diaz ...................................... 156/86
4,598,165 * 7/1986  Tsai ....................................... 174/78

(List continued on next page.)

FOREIGN PATENT DOCUMENTS 8601264   7/1986  (DE) .
3720577   2/1988  (DE) .
3712356  10/1988  (DE) .

(List continued on next page.)

OTHER PUBLICATIONS

Patent Abstracts of Japan, vol. 008, No. 284 (M–348), Dec. 26, 1984 & JP–A–59–152814 (Kukuhou Kogyo KK), Aug. 31, 1984 (abstract only).
Patent Abstracts of Japan, vol. 014, No. 231 (M–0974), May 16, 1990 & JP–A–02–059322 (Fujikura Ltd.), Feb. 28, 1990 (abstract only).
Search Report for British Application No. GB 9510953.4, dated Aug. 24, 1995.
Search Report for International Application No. PCT/GB96/01277, dated Aug. 27, 1996.
WPI Abstract Accession No. 80–10401C & JP 54–163974 (Hitachi Cable KK), Dec. 27, 1979 (abstract only).
WPI Abstract Accession No. 86–335046 & JP 61–249738 (Furukawa Electric Co.), Nov. 6, 1986 (abstract only).

(List continued on next page.)

*Primary Examiner*—Rena L. Dye (57) ABSTRACT

A dimensionally heat recoverable tubular article (1) is made by spirally wrapping cross-linked polymeric sheet (3) a number of times, and directly fusing together overlapping layers (5) of the cross-linked sheet (3) to form a consolidated tubular article. The final article has a wall thickness of at least 2.2 mm. Articles according to the invention may be made of different diameter and different wall thickness, starting from the same thickness initial sheet material, simply by changing the circumference of wrapping or the number of spiral wraps. Articles according to the invention are particularly useful as casings over joints between district heating pipes.

3 Claims, 4 Drawing Sheets

U.S. PATENT DOCUMENTS

| | | |
|---|---|---|
| 4,732,412 | 3/1988 | van de Linden et al. ............. 285/47 |
| 4,788,089 * | 11/1988 | Skipper ................................ 428/34.9 |
| 4,832,248 | 5/1989 | Soni et al. ........................... 228/56.3 |
| 4,866,252 | 9/1989 | Van Loo et al. ..................... 219/535 |
| 4,929,478 * | 5/1990 | Conaghan et al. .................. 428/35.1 |
| 4,938,820 | 7/1990 | McMills ................................. 156/83 |
| 4,944,987 | 7/1990 | Cordia et al. ........................ 428/192 |
| 5,030,487 * | 7/1991 | Rosenzweig ........................ 428/34.9 |
| 5,134,000 * | 7/1992 | Smythe et al. ...................... 428/34.9 |
| 5,175,032 * | 12/1992 | Steele et al. ......................... 428/34.9 |
| 5,236,765 * | 8/1993 | Cordia et al. ........................ 428/35.1 |
| 5,302,428 * | 4/1994 | Steele et al. ......................... 428/34.9 |
| 5,486,388 * | 1/1996 | Portas et al. ........................ 428/34.9 |
| 5,560,847 | 10/1996 | Doucet ................................ 219/535 |
| 5,662,974 * | 9/1997 | Andrenacci et al. ............... 428/36.9 |

FOREIGN PATENT DOCUMENTS

| | | |
|---|---|---|
| 154730 | 12/1988 | (DK). |
| 0075901 | 9/1982 | (EP). |
| 0079702 | 5/1983 | (EP). |
| 0188363 | 7/1986 | (EP). |
| 0245067 | 11/1987 | (EP). |
| 0258827 | 3/1988 | (EP). |
| 0158519 | 6/1988 | (EP). |
| 0270283 | 6/1988 | (EP). |
| 0626742 | 11/1994 | (EP). |
| 1161259 | 8/1969 | (GB). |
| 2108625 | 5/1983 | (GB). |
| 2184804 | 7/1987 | (GB). |
| 54-163974 | 12/1979 | (JP). |
| 61-249738 | 11/1986 | (JP). |
| 59-152814 | 8/1994 | (JP). |
| 83/00779 * | 3/1983 | (WO). |
| WO 88/06517 | 9/1988 | (WO). |
| WO 89/05230 | 6/1989 | (WO). |
| 89/09128 * | 10/1989 | (WO). |
| WO 93/08012 | 4/1993 | (WO). |
| WO 93/08013 | 4/1993 | (WO). |
| WO 93/19925 | 10/1993 | (WO). |
| WO 95/25243 | 9/1995 | (WO). |

OTHER PUBLICATIONS

WPI Database, Week 8441, Derwent Publications Ltd., London, AN 84–253337 & JP–A–59–152814 (Fujikura Cable Works KK, Nippi KK), Aug. 31, 1984 (abstract only).

J.N. Anand and H.J. Karam, *J. Adhesion*, vol. 1, Jan. 1969, p. 16–23.

J.N. Anand and L. Dipzinski, *J. Adhesion*, vol. 2, Jan. 1970, p. 16–22.

* cited by examiner

HEAT RECOVERABLE ARTICLE

BACKGROUND OF THE INVENTION

1. Field of the Invention

This invention relates to a tubular, dimensionally heat recoverable, polymeric article comprising a spirally wrapped polymeric sheet, to methods of making the article, and to methods of using the article to bridge two elongate substrates.

2. Introduction to the Invention

A dimensionally heat recoverable article is an article the dimensional configuration of which may be made substantially to change when subjected to heat treatment. Usually these articles recover towards an original shape from which they have previously been deformed but the term "recoverable", as used herein, also includes an article which adopts a new configuration, even if it has not been previously deformed. In their most common form, heat recoverable articles comprise a shrinkable sleeve made from polymeric material.

Commonly, processes for producing heat recoverable articles involve cross-linking the polymer at some stage in the production process to enhance the desired dimensional recoverability. A particular method of producing a heat recoverable article comprises shaping the article into the desired heat stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use since the deformed state of the article is heat unstable, application of heat will cause the article to assume its original heat stable shape. Cross-linking may conveniently be carried out by irradiation, or by chemical means.

European Publication No. 0158519 describes a heat recoverable article for covering elongate substrate(s), the article comprising a heat recoverable, cross-linked, polymeric sheet having a resistance heating element arranged in thermal contact with the sheet, the resistance element being connected to a source of electrical power to heat and hence recover the article. In order to install the article, the sheet containing the heating element is spirally wrapped one or more times around the substrate(s) prior to the heating. The sheet is usually lined with adhesive, and after heating and recovery, adjacent layers of the sheet are bonded to each other.

Relatively thin wall tubular products (wall thickness 0.4 to 2 mm), apparently comprising spirally wrapped, cross-linked, polyethylene layers, overlapping layers of which are pre-bonded to each other by copolymer bonding layers, probably an ethylene vinylacetate bonding layer, have been available on the market for a number of years. These thin wall sleeves typically range in diameter from about 50 to 1000 mm, and typically find application for pipe covering and the like.

Japanese Patent Publication No. 54-163974 (Hitachi) describes a method of making a heat shrinkable composite pipe by winding a tape of two or more water cross-linkable polymers around a mandrel, integrating the layers by heat, and subsequently cross-linking the polymers in water or humidity. The pipe is made heat shrinkable by introducing a pressurized fluid to expand it, and cooling in the expanded shape.

Japanese Patent Publication No. 61-249738 (Futukawa) describes a method of making a heat shrinkable polyolefin coating material by winding silane graft polyolefin sheet onto a mandrel, in the presence of a silanol condensation catalyst, to give a laminate of a desired thickness. The wound sheet is then heated to weld the overlapping layers and to cross-link. The cross-linked tube is then expanded and cooled in the expanded shape.

SUMMARY OF THE INVENTION

A first aspect of the present invention provides a heat recoverable, tubular article comprising a spirally wrapped, cross-linked, polymeric sheet, overlapping layers of the cross-linked sheet having been directly fused to each other to form a consolidated tubular article, the consolidated tube having a thickness of at least 2.2 mm.

In contrast to European Publication No. 0158519 described above, in the present invention the overlapping layers of the spirally wrapped layers of sheet are directly fused to each other prior to recovery of the sheet. This direct fusion step is typically carried out in the factory prior to supply of the product to the end-user. Hence a consolidated multi layer recoverable tubular article in which the layers are pre-bonded to each other, is available for installation by the end user.

In contrast to the thin-walled commercially available sleeves referred to above, articles according to the invention are much thicker walled, and do not incorporate a separate bonding layer between overlapped layers of the sheet. Furthermore, the thicker walled articles of the present invention, being much stronger, may be used for forming joints between substrates such as pipes. In contrast to the pipes and tubes made according to Japanese Patent Publication Nos. 54-163974 and 61-249738, the article according to the invention is made from a polymeric sheet that is cross-linked prior to its spiral wrapping, and consolidation. In the Japanese references, the cross-linking is carried out after wrapping.

DETAILED DESCRIPTION OF THE INVENTION

Heat recoverable articles according to the invention have a minimum wall thickness of 2.2 mm. Preferably the wall thickness is substantially uniform over the full length and/or over the entire periphery of the article. The minimum wall thickness of 2.2 mm is for the fused, wrapped layers alone, independent of any separate sealing material, or other material which may be used as a lining.

The spiral-wrap, or cigarette wrap, configuration of the article of the invention advantageously allows relatively thick wall products (e.g. 2.2 mm or higher, often 3 mm or higher, 5 mm or higher or even 8 mm, 10 mm, 15 mm or higher), to be made from sheet material of one or a few different thinner thicknesses. Different thicknesses of article can be achieved by using an increased number of layers in the spiral wrap, or by increasing the thickness of the component sheet, or by a combination of both. Furthermore, the spiral wrap configuration allows a number of different diameter tubular articles to be made from sheet material of a single thickness. For example, articles according to the invention, varying in diameter from about 90 to 1400 mm, or even up to about 2500 mm, can easily and conveniently be made. The invention therefore allows a large range of thickness and diameter tubular products to be produced, without the need to invest in tubular extrusion, expansion and/or molding equipment for each diameter and wall thickness product.

Overlapping layers of the spirally wrapped polymeric sheet are directly fused to each other. The term "directly fused to each other" is used herein to mean that sufficient molecular interaction between adjacent overlapping layers of the sheet occurs that a bond forms which will provide mechanical performance equal to or greater than that of the sheet itself. This direct fusion may be through viscoelastic contact as defined by J. N. Anand in Adhesion 1, 1969, pages 16 to 23 and Adhesion 2, 1970 pages 16 to 22, or through a molecular diffusion across the polymer/polymer interface. To test whether overlapping layers of a spirally wrapped article are directly fused to each other, peel strength measurements between the layers may be made.

The fact that overlapping layers are directly fused to each other does not preclude the presence of other materials between adjacent layers, provided a fusion bond can be formed around those materials. It may, for example, be useful to include reinforcing materials e.g. glass fibers, carbon fibers, ultra high modulus polyethylene fibers, aramid fibers, ceramic fibers or the like, either in non-woven, or in woven or other fabric form, between adjacent layers. Such reinforcing fibers may increase the strength in both the axial and hoop directions, and may also increase the impact strength. It may also be useful to include heating members between some or all of the overlapping layers. These might be in the form of resistance wire heaters, metal mesh members (activated by induction) or the like. For example in a four layer structure such heaters might be included between the second and third layers. The purpose of the heaters would typically be to provide the heat to effect recovery of the article, in installation. The presence of the heaters between overlapping layers may speed up heat transfer to the layers. The heaters might also, or instead, be used to provide the heat, or some of the heat, to effect the consolidation of the overlapped layers.

The polymeric material of the wrapped sheet is cross-linked prior to its spiral wrapping. The advantages of cross-linking for various end uses is discussed later. For some applications the polymeric material of the wrapped sheet is preferably substantially 100% cross-linked. By 100% cross-linked we mean that sufficient cross-links exist between adjacent long chain carbon molecules that a single molecule exists substantially throughout the polymeric sheet. However while 100% cross-linking may be desirable, the overall cross-linking density is preferably not so high as to prevent direct fusion between the overlapping layers of the wrapped sheets of the article.

For certain applications it is preferred that the sheet is non-uniformly cross-linked through the thickness of the sheet. For example the sheet may be more cross-linked on one surface of the sheet than the other surface of the sheet, the amount of cross-linking preferably gradually decreasing across the thickness of the sheet. In this case, the more cross-linked surface may be positioned outwardly or inwardly in the wrapped configuration. Preferably the more cross-linked surface is positioned outwardly in the wrapped configuration. Where we say the sheet may be more cross-linked on one surface than on the other surface thereof, we include the possibility that the sheet is substantially uncross-linked on the said other surface. Various techniques known to the man skilled in the art can be used to produce a non-uniformly cross-linked sheet. For example to produce a sheet that is more cross-linked on one major surface than on the other major surface thereof, a low intensity radiation source may be used directed onto one surface only of the sheet.

The above described construction, in which one surface of the sheet is more cross-linked than the other surface, may advantageously enhance the fusion bonding between adjacent layers. This may facilitate production of the article according to the invention.

Another method of enhancing fusion bonding between adjacent layers is by special selection of the material for the spirally wrapped sheet. Therefore, preferred embodiments of the invention use a wrapped sheet comprising a blend of suitable and compatible copolymers and a main polymer. Suitable copolymers that may be blended with a main polymer such as polyethylene (or another olefin) include ethylenevinylacetate, ethylenebutylacrylate, and ethylenemethylacrylate, and the like. A particularly preferred material for the polymeric sheet comprises 80 to 90% high density polyethylene and 10 to 20% ethylenebutylacrylate, preferably about 85% high density polyethylene and 15% ethylenebutylacrylate.

Especially preferred articles according to the invention use both (i) added copolymers in the polymeric sheet, and (ii) differential cross-linking across the thickness of the sheet, in order to enhance fusion bonding, but articles embodying only (i) or only (ii) are also envisaged as preferred articles according to the invention.

The articles according to the invention may be made by any appropriate method. Suitable methods typically use heat to cause the direct fusion. Heat may be applied by an oven, or any other heating means. Second and third aspects of the present invention provide two particular methods that may be used to make articles according to the invention.

Thus, a second aspect of the invention provides a method of making a heat recoverable article which comprises:

(i) spirally wrapping a heat recoverable, cross-linked, polymeric sheet to form a tubular configuration comprising two or more overlapping layers of the spirally wrapped sheet;

(ii) positioning the wrapped sheet relative to a support mandrel so that the wrapped sheet surrounds the support mandrel; and (iii) heating the sheet to a temperature sufficient to cause direct fusion between adjacent overlapped layers of the sheet.

Steps (i) and (ii) may be carried out substantially simultaneously, e.g. the sheet may be spirally wrapped directly onto the support mandrel. Instead, step (ii) may be carried out after step (i). For example, the pre-wrapped sheet may be slid over a mandrel.

Conveniently the heating step (iii) is carried out after the sheet has been positioned on the mandrel, e.g. in an oven. Instead, or in addition, heat may be applied while the sheet is being spirally wrapped (provided it is already on a mandrel so cannot recover completely), or as a pre-heat to the mandrel prior to wrapping. Applying heat during wrapping or as a pre-heat to the mandrel, means that heat is applied more directly to the inner layers as they are wrapped. When post heating is used heat must reach the inner layers by heat transfer, which is generally slower. Heating during wrapping, or pre-heating of the mandrel could conveniently be provided by an infra red heater.

In step (iii) the article is heated to a temperature sufficient to cause fusion between the adjacent overlapped layers of the sheet. This temperature is preferably above the crystalline melting point Tm of the polymer, or above the glass transition temperature $T_g$ of the polymer for amorphous polymers, preferably between 10° C. and 60° C. above. Preferably the temperature is not so high as to degrade the material of the polymeric sheet. Preferably it is at most 100° C. above the $T_m$ or $T_g$, whichever is appropriate.

In a preferred embodiment, the polymeric sheet comprises cross-linked high density polyethylene (either 100% cross-linked as hereinbefore defined, or cross-linked only part way through the depth of the sheet, as hereinbefore described), optionally blended with compatible polymers, as hereinbefore described. An article made from this composition (which has a melting temperature of about 125° C.) is preferably heated to a temperature of at least 160° C., preferably at least 180° C. This temperature may also be appropriate for other polymer compositions.

For heat recoverable polymeric materials, the temperature required to cause the direct fusion is a temperature above the recovery temperature of that polymeric material. Therefore step (iii) in the above method will cause some recovery of the article. Where, as is preferred according to the second aspect of the invention, the sheet is radially heat-shrinkable, the mandrel is preferably appropriately sized to prevent full recovery of the article.

The amount of recovery available in articles according to the invention depends on their intended use. Recovery ratios over a very broad range between 2% and 500% may be useful for various applications. For joining dual containment pipes, or thermally insulated pipes, recovery ratios of about 5 to 50% are preferred. In the method of manufacture according to the second aspect of the invention, the mandrel is therefore preferably sized so that the tubular article formed thereover still has the desired available recovery ratio, depending on the application. This may be anything from 2% to 500% as mentioned. A recovery percentage is the change in dimension as free recovery expressed as a percentage of the original dimension. A recovery ratio is the ratio of the original dimension based on the new dimension. For example a 40% recovery percentage corresponds to a recovery ratio of 1.67 to 1.

As mentioned above, the heat recoverable sheet material is preferably radially heat shrinkable. Therefore when heat is applied to cause the fusion between the layers, it also causes each layer to be urged towards its adjacent underlying layer, and exerts a radial pressure on its underlying layer. This acts to enhance the direct fusion.

In addition to the inherent pressure caused by recovery of the layers during the heat applied to consolidate the article, the method according to the second aspect of the invention preferably additionally comprises the application of an extrinsic radial pressure. This may enhance still further the direct fusion between the overlapping layers, and/or exclude entrapped air. This extrinsic pressure is applied radially inwards to the sheet wrapped on the mandrel. Preferably it is applied at the same time as the heating step, or soon thereafter, or both. Conveniently a pressure between 0.02 kg km$^2$ to about 0.10 kg km$^2$, expressed in the normal direction to the tube wall may be used. A convenient means to apply the pressure is to wrap and clamp a tensioned elastomeric band around the wrapped sleeve on the mandrel, for example a stretched silicone band may be used. The tensioned band preferably covers the entire outer surface of the wrapped sheet.

Preferably the heat and pressure are applied to the overlapped sheet on the mandrel at the same time, and for sufficient time to enhance the direct fusion between the overlapped layers of the wrapped sheet. Times of at least 15 minutes, preferably at least 30 minutes, more preferably at least 45 minutes, or even at least an hour may be used.

The method according to the second aspect of the invention, in its preferred form, therefore involves the application of heat and pressure over a significant time period in order to cause direct fusion between the overlapped layers. The result is a laminated or consolidated structure. Preferred temperatures, pressures and times have been given above. However, it would be evident to the man skilled in the art they there could be varied while achieving the desired bonding. For example lower temperatures and pressures could be used if the time held at these temperatures and pressures were increased, and so on.

A third aspect of the invention provides a second method of making articles according to the invention. This method comprises (i) spirally wrapping a heat stable, cross-linked, polymeric sheet to form a tubular configuration comprising two or more overlapping layers of spirally wrapped sheet;

(ii) heating the wrapped sheet to a temperature sufficient to cause fusion between adjacent overlapped layers of the sheet; and (iii) expanding the fused layers radially outwards, whereby the article is rendered heat recoverable.

In contrast to the first method, the second method initially wraps heat stable rather than heat recoverable sheet. Therefore during the heating step, to cause lamination and consolidation, no support mandrel is needed to prevent recovery, However a mandrel may be used. This method also involves an additional step, after the consolidation process, of expansion to render the article heat recoverable. This expansion is preferably done at a temperature above the crystalline melting temperature of the polymeric sheet (or for amorphous materials the softening point), then the article is cooled in its deformed state. The expansion step therefore preferably follows immediately after the fusion is complete, so that no separate heating step is required.

As in the first method of making articles according to the invention, pressure is preferably applied, to enhance fusion between the sheet layers, at the values given above, and the heat and pressure applied for a sufficient time, as mentioned above.

In both methods according to the invention the sheet is cross-linked, preferably 100% cross-linked, or for certain applications non-uniformly cross-linked in the manner described in respect of the article according to the invention. The cross-linked nature of the sheet allows the wrapped sheet to be heated, according to preferred methods of the third aspect of the invention, to temperatures above its melting point in order to be expanded and rendered heat recoverable.

Heat recoverable articles have a number of well known uses, including the covering, connection and/or termination of pipes, cables or wires. Articles according to the present invention may be used in any of these applications. Two particular applications for articles of the present invention are (a) as a joint for jacket continuation of thermally insulated pipes and (b) the joining of pipes, including the joining of pre-fabricated dual containment pipes.

When a joint is made between two lengths of thermally insulated pipe (e.g. steel pipe), as used for example in a district heating system, it is usual to remove the insulation from the end regions of each length of pipe in order that the insulation is not burnt when the pipes are joined, joining usually being effected by welding. After the weld has been completed, the uninsulated portion of the pipe in the region of the joint must be reinsulated in order to minimize heat loss. It is important that the insulation in the region of the joint is sealed against moisture ingress which might otherwise cause degradation of the insulation, and also corrosion of the pipes.

Severe physical constraints are placed upon the seal of the insulation at a joint between insulated pipes in a district heating system. As a result of frequent and wide temperature cycling, the pipe can be subjected to expansion and contraction cycles and to longitudinal and transverse movement. For example, it has been determined that forces of up to 10N mm$^{-2}$ can be exerted on the outer protective jacket of an insulated pipe as a result of temperature cycles experienced by a pipe in winter before it is buried. The seal must be able to withstand these cycles and movements without breaking. Furthermore it is preferred that the seal be able to withstand the pressures exerted when the cavity around the insulated portion of pipe is reinsulated by foaming in situ.

Commonly used systems for reinsulating and sealing the joint of thermally insulated pipelines involve the use of a separate casing bridging the cut back insulation on the pipelines either side of the joint, and sealed to the cut back insulation in some way. Existing systems can be classified as flexible, semi-flexible, or rigid systems. Flexible systems typically use a casing in combination with separate flexible seals, usually incorporating a mastic. The flexible seals typically bridge the insulation surrounding each pipe, and the casing, the seal flexing or stretching to accommodate soil stresses on the joint. Such a system is described for example in British Patent No. 2,108,625 (Raychem), which uses thin wall end seals coated with strips of adhesive and mastic, in combination with a non-shrinkable casing. Semi-flexible systems typically are end seals bridging the insulation surrounding each pipe, and the casing. The end seals are rigidly fixed at both ends and have a central mastic coated central zone. These end seals will allow some limited movement and stress relief between pipe sections, while transmitting the remainder of the force. Rigid systems, in contrast, are designed to be sufficiently strong to withstand the forces encountered during installation, and service life, without flexing or stretching, so that tensile or compressive forces applied to one pipeline section are transmitted through the casing to the adjacent pipeline section. Danish Patent No. 154730 (Logstor) describes a system which is substantially rigid, and European Patent Publication No. 0245067 (Raychem) describes a system which may be either semiflexible or rigid, depending on the wall thicknesses of the sleeves used, and the diameters and wall thicknesses of the pipes and casings bridged.

The casings used in the prior art include both heat shrinkable and heat stable casings, and cross-linked and non cross-linked casings. Danish Patent No. 154730 (Logstor) for example describes a non-cross-linked polyethylene heat shrinkable casing which is rendered heat shrinkable by molecular orientation only. The ends of the casing are lined with hot melt adhesive capable of adhering to polyethylene. Similarly British Patent No. 2184804 (Tjaerekompagniet Danske Gasvaerkers Tjaere Kompagni) describes a casing which may be cross-linked, and which is expanded at the ends only to render those ends heat recoverable. The inner surface of the ends of the casing may be provided with a welding or adhesive layer.

European Patent Publication No. 0188363 (Shaw) describes a cross-linked heat shrinkable tubular casing the inside surface of which is coated with an adhesive or sealant, but is preferably an adhesive with a shear strength, not less than 3 psi. This enables the joint to resist shear stresses, i.e. provides a rigid sealing system in which tensile and compressive forces applied to one cut-back pipe covering are transmitted through the casing to an adjacent cut-back pipe covering.

Advantages of the heat shrinkable systems are that they can be manufactured over-sized relative to the cut back pipe ends, so that they can be easily slipped over those pipe ends.

Heat recoverable articles according to the invention find applications as casings for joints between thermally insulated pipes. They can be used in a manner similar to that described with reference to the above prior art.

Thus, a fourth aspect of the present invention provides a method of insulating a joint between thermally insulated pipes, the insulation of which ends short of the joint, leaving a portion of the pipe bare of insulation, the method comprising:

(a) positioning around the bare portion of the pipe a tubular article according to the invention; and (b) heating the article to cause it to recover into contact with the insulation of each of the pipes.

Similarly articles according to the invention may be used for pipe coupling, and are particularly useful for coupling dual containment pipes, where particularly strong joints are required.

Articles according to the invention may be lined on part or all of their inner surface with a variety of adhesives or mastics or a combination thereof. For example, in the method of use according to the fourth aspect of the invention, a mastic may be included to form a flexible joint between the article (used as a casing) and thermally insulated pipes or a heat activatable, e.g. hot melt adhesive, may be used to form a rigid joint between the article (used as a casing) and thermally insulated pipes. The adhesive, mastic or other sealing material may cover the entire inner surface of the article, or may advantageously be only at the ends. Instead of providing adhesives, or other sealing materials, preinstalled on articles, in methods according to the fourth aspect of the invention, or in similar methods for different applications, the sealing materials may be provided as separate strips, installed on site between the article and the substrate. The use of separate strips avoids the need for protective coverings over adhesive-lined articles. Protective covering might otherwise be needed to prevent contamination.

When using a separate adhesive strip, especially a hot melt strip, in an application where the strip is placed in an open annulus (e.g. between an article according to the invention and a pipe surface), the adhesive strip may be prematurely melted by the heat applied to recover the article, and may drop away from its correct position. Therefore, preferably, such separate adhesive strips are reinforced, e.g. by fibers. This reinforcement will not prevent melting, but will prevent the adhesive strip dropping away from its correct position. Such reinforcement may also improve the mechanical performance generally of the adhesive. The invention therefore also provides a kit of parts comprising an article according to the invention in combination with separate adhesive strips the adhesive strips preferably being reinforced.

A combination of a heat activatable (e.g. hot melt) adhesive and a mastic ring may be used. In one embodiment a ring or wrapped strip, of a hot melt adhesive is provided adjacent a ring of mastic between the article and a substrate. For example for a joint between thermally insulated pipes, a hot melt adhesive ring, or wrapped strip, is preferably positioned adjacent to a mastic ring, or wrapped strip, between the article (providing the casing) and the pipe insulations, at each end of the casing. The adhesive may be positioned, nearer than the mastic, to the end of the casing, or vice versa. The heat activatable adhesive rings and mastic rings may be provided as a lining on the sleeves, or as separate strips.

In another embodiment a discrete strip, comprising a layered construction, of a layer of heat activatable adhesive and a layer of mastic, may be used between the article and a substrate. The heat activatable adhesive and the mastic layers may be substantially the same shape and size and overlay each other substantially exactly. In another embodiment a combination of a wide tape of heat activatable adhesive and a narrower tape of a mastic on one surface of the adhesive, may be used. Where a wide adhesive tape and narrower mastic tape combination are used, the mastic tape may be positioned centrally on the adhesive tape, or towards one side thereof. Typically the adhesive tape may be about 50 mm to 150 mm wide, and the mastic tape about 25 mm to 100 mm wide. A particularly preferred embodiment comprises a tape of adhesive about 100 mm wide and a tape of mastic about 50 mm wide.

Where a layered construction of a heat activatable adhesive and a mastic is used, the adhesive may be positioned nearer than the mastic to the substrate, or vice versa. In preferred embodiments the mastic is nearer to the substrate than the adhesive. This gives the following advantages. Firstly, the mastic is typically easier to attach to the substrate (e.g. pipe surface) than the adhesive. Secondly, for articles that are recovered by an external heat source such as a gas torch, the interface between the article and the adhesive reaches a higher temperature than the interface between the adhesive and the substrate. Typically, where a gas torch is used to achieve recovery, the interface between the article and the adhesive reaches a temperature of about 100° C. to 110° C. This temperature is sufficient to activate a wide range of commonly available heat activatable adhesives. Thirdly, since the mastic is separated from the article by the adhesive, it allows the article to be positioned over the adhesive/mastic strip, without the risk of article sticking prematurely, in the incorrect position, to the tacky mastic. It consequently avoids the need to remove any release layer from the mastic once the article is in position.

The adhesive/mastic combinations are particularly useful where the article is a casing for joints between thermally insulated pipes, and the substrate is the pipe. For this application, the wide adhesive tape/narrower mastic tape combination/ is particular advantageous to improve leak resistance between the casing and the pipe insulation. Similar adhesive/mastic combinations may, however, be suitable for other applications, e.g. joints between dual containment pipes.

Where heat activatable adhesives are used between the article and the substrate, it may be beneficial to preheat the substrate prior to applying the adhesive and article. Preheat temperatures of at least 40° C., or 60° C. or 80° C., or 100° C. may be useful, depending on the adhesive used.

Where an externally applied heat source is used, such as a gas torch, thermally reflective blankets may be provided over, part of the outer surface of the article, so that a sharp, stepped transition is achieved, immediately adjacent the blanket, after recovery. This may be desirable for some applications, and may enhance sealing.

Other articles according to the invention may incorporate separate or integral welding heaters, in order to achieve a direct fusion joint between the article and a substrate on which it is placed. For example, for the thermally insulated pipe example given above, an interface heater may be incorporated between the inner surface of the article and the outer surface of the cut back pipe insulation.

Where a direct weld between the article and a substrate is to be achieved, articles according to the invention preferably include at least a lining layer which comprises a noncross-linked material. Preferred embodiments of articles according to the invention are therefore cross-linked throughout the main body of the article to provide reproducible and consistent recovery reproducibility as hereinafter described, but include a non-cross-linked inner lining layer. Other preferred articles according to the invention comprise a sheet that is non-uniformly cross-linked throughout its thickness as hereinbefore described, the inner surface being less cross-linked than, the outer surface, or not cross-linked at all. Thus the inner surface of the inner wrap of the sheet provides a non-cross-linked lining layer suitable for forming a direct weld to a substrate.

Articles according to the present invention comprise cross-linked polymeric sheet. Recoverable articles that have been rendered recoverable by expanding a cross-linked preform typically provide more reproducible and consistent recovery behavior than recoverable articles that have been rendered recoverable merely by molecular orientation.

Since the cross-linked heat recoverable articles according to the invention have such consistent and reproducible recovery behaviour, they can advantageously be used without additional end seals.

Particularly where articles according to the invention are thick-walled, after recovery elastic strain may remain in the ends of the article. This means that the article has the ability to contract further after cooling. Values of about 3% strain may be present, for example, for high density polyethylene. This is particularly advantageous if a flowable bonding mechanism is used to bond directly the article to a substrate, since the extra shrinkage available acts to urge flowable material to fill any gaps or voids.

Furthermore, compared to non-cross-linked recoverable articles, cross-linked recoverable articles retain their recovery characteristics during storage better (especially when rendered recoverable by expansion about their crystalline melting temperature), do not require reflective packaging to prevent premature shrinkage from exposure to the sun, and typically recover at higher temperatures allowing the use of the higher temperature heat-activatable adhesives, which typically have better service performance than lower temperature heat activatable adhesives.

Where the article is to be fused to a substrate, an intermediate welding heater may be used. Examples are resistance wire heaters, or metal mesh members heated by induction. The welding heater may cause the material of the article to fuse directly to the substrate, or indirectly via the welding heater. In one embodiment, these may be used as a welding heater, a conductive polymer interface heater, preferably in the form of a tape, such as described in International Patent Publication Nos. WO88/06517 or WO89/05230. Such a tape preferably comprises ultra high molecular weight polyethylene (UHMWPE), preferably sintered, containing a conductive filler such as carbon black. The tapes are conductive and preferably contain elongate electrodes e.g. in the form of conductive braid extending along their long edges, which can be connected to a source of electrical power to pass electrical current through the tape, thereby heating the tape. When heated the material of the tape may fuse to any compatible polymeric article to which it is adjacent. A preferred article according to the invention therefore includes a conductive polymer tape, preferably of the type described above extending around the inner periphery of each end of the article. This tape may be powered electrically, heat, and fuse to the article and adjacent substrates. In this case the fusion between the article and the substrate is indirect, via the welding tape. For example, if the article according to the invention is being used as a casing for joining thermally insulated pipes, one side of the conductive tape will fuse to the article (casing) and the other side to the pipe insulation. Similarly if the article is being used to join dual containers or other pipes, one side of the tape will fuse to bond to the article and the other side to the pipes. Instead of being preinstalled on the article surface, the conductive tape may be supplied as a separate part.

For some applications, where the article has a thickness of about 2.5mm, the conductive tape when activated may also provide sufficient heat to cause shrinkage of the ends of the recoverable article. In these cases, a two step heating procedure may be used. A first current may be passed to cause recovery, and a second current passed to cause fusion between the article and substrates. Typically a lower power is needed to cause recovery than to cause fusion. For other applications a different heating method may be used for the recovery step, e.g. a gas torch, thermal blanket, or heat shrinkable electrical heaters.

This two step heating process using a conductive polymeric heating tape, or other heating element is novel per se, irrespective of the type of article to which it is bonded (e.g. including non-multi wrap articles). Therefore another aspect of the invention provides a method of bonding a recoverable polymeric article to a polymeric substrate comprising:

(a) positioning a tape comprising a conductive polymeric material, or other heatable element, between the inside surface of the ends of the article and the substrate;

(b) passing electrical current through the tape or other heating element, at a power density sufficient to heat the ends of the article, to recover them into contact with the substrate; and then (c) passing electrical current through the tape or other heating element, at a second higher power density, sufficient to cause one surface of the tape to fuse to the article, and the other surface of the tape to fuse to the substrate.

A process in which a heating element is pre-installed on the inner surface of a recoverable tubular polymeric article, the heating element being used to recover the article, and/or to weld the article to a substrate, and being capable of following the recovery of the article, is also novel per se.

Therefore another aspect of the invention provides a method of bonding a recoverable tubular polymeric article to a polymeric substrate comprising:

(a) providing one or more heating elements pre-installed on the inner surface of a recoverable tubular polymeric article, which heating element(s) are capable of following the recovery of the article, (b) positioning the article around a substrate, and (c) activating the heating elements, whereby the heat generated by the heating elements causes the article to bond to the substrate.

In order to follow the recovery of the article typical heating element may be deformable, e.g a deformable mesh. As another heating element the conductive polymeric tapes described above may be used.

In this method the heat from the heating elements may instead, or in addition, be used to recover the article, at least at its ends.

The entire disclosures of International Patent Publication Nos. WO88/06517 and WO89/05230 are incorporated herein by reference.

Cross-linked articles according to the invention may be directly welded to pipe insulation (or another substrate) without the need for any separate external pressure application. Sufficient heat, for a sufficient time, must be applied to achieve a strong welding force. However excessive heat must be avoided, which could lead to thermal expansion of the article, and consequent reduction of the recovery force.

In contrast, a number of directly welded non-cross-linked shrinkable cases available on the market rely on external pressure, applied through mechanically or hydraulically activated external clamps, in combination with welding heaters.

Where the article includes a lining layer of adhesive, the adhesive may be arranged to act as a temperature indicator to show when sufficient heat for bonding to an underlying substrate has been achieved. For example, it may change color at the said temperature, it may flow and become visible from the outside, at the said temperature. Other envisaged embodiments include adhesive applied in a non planar configuration e.g. ridged or bumped, the ridges or bumps disappearing when sufficient heat has been applied.

Instead of being directly bonded to the pipe insulation on either side of a joint between thermally insulated pipes, either by welding or adhesive, articles according to the invention may be used in conjunction with separate shrinkable end seals, coated with adhesive or mastic or a combination thereof.

Where articles according to the invention are to be used in a method according to a fourth aspect of the invention (to act as a casing between thermally insulated pipes) the articles may be used in conjunction with separate end seals which bridge the casing and pipe insulation, or the casings may be directly welded (i.e. fusion bonded) to the pipe insulation. When a welding system is to be used the article is preferably lined with a compatible non-cross-linked material to effect the weld.

For certain applications, it may be advantageous to provide additional thick wall sleeves, surrounding the ends of the article according to the invention. Such sleeves are preferably short thick wall sleeves, and are preferably heat recoverable. Such additional sleeves may be particularly useful where articles according to the invention are to be used to bond to substrates where the bond is to be subject to internal pressure. An example is where a high density polyethylene article is to be used to join dual containment pipes. For example if such an internal pressure resulted in a 5 MPa hoop stress in the article, such a stress would generate an elastic strain of about 3% in the article walls. In order to prevent any possibility of leakage as a result of this strain, the use of additional reinforcing end sleeves is recommended, thereby reducing the hoop stresses, and consequent strain, to acceptable levels. Typically sleeves as thick as the article itself are used, or thicker. These may reduce the hoop stress locally by a factor of one half, or more. The invention therefore provides a kit of parts containing an article according to the invention in combination with additional end reinforcing sleeves, and a method of their use. One separate sleeve may be used at each end, or several sleeves applied side by side, and/or on top of each other. Preferably sufficient additional sleeves are used to reduce the elastic strain at the ends to at most 1%.

Preferred materials for articles according to the invention are polyolefins, e.g. polyethylene. In a particularly preferred construction the article comprises medium or high density polyethylene, preferably cross-linked. A non-cross-linked lining layer, if present, may comprise a compatible polymer, such as non-cross-linked polyethylene.

Installation of articles according to the invention, for any application, can be carried out by any convenient heating method, as well known in the art. For example a torch, hot air gun, electrical resistance heating or induction heating can be used. Selection of a heating method will depend on the application, and will be apparent to the man skilled in the art.

BRIEF DESCRIPTION OF THE DRAWINGS

Embodiments of the present invention will now be described, by way of example, with reference to the accompanying drawings wherein.

DETAILED DESCRIPTION OF THE DRAWING

Figure 1:
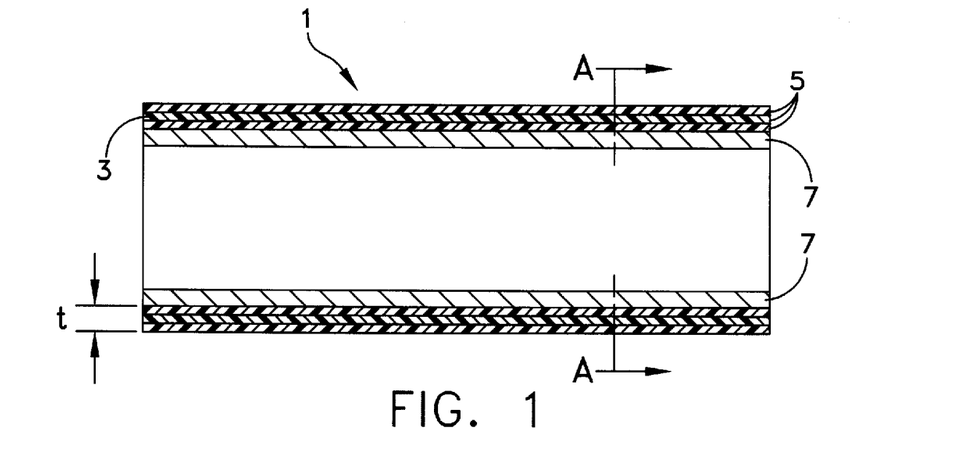
FIG. 1 is a longitudinal section of an article according to the invention.
Figure 2:
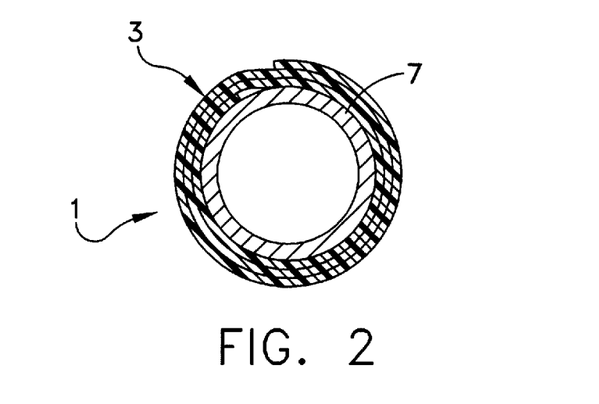
FIG. 2 is a cross-section taken along line A—A of FIG. 1.

Referring to the drawings FIGS. 1 and 2 show a tubular article 1 comprising sheet 3 of cross-linked, heat recoverable high density polyethylene, wrapped spirally wrapped to form the tubular article. Each layer 5 of the wrapped sheet 3 is directly fused to its adjacent layers. The overall thickness of the wrapped layers t is about 3 mm in the example shown. The article includes an additional lining layer 7 that comprises non-cross-linked low density polyethylene.

Figure 3:
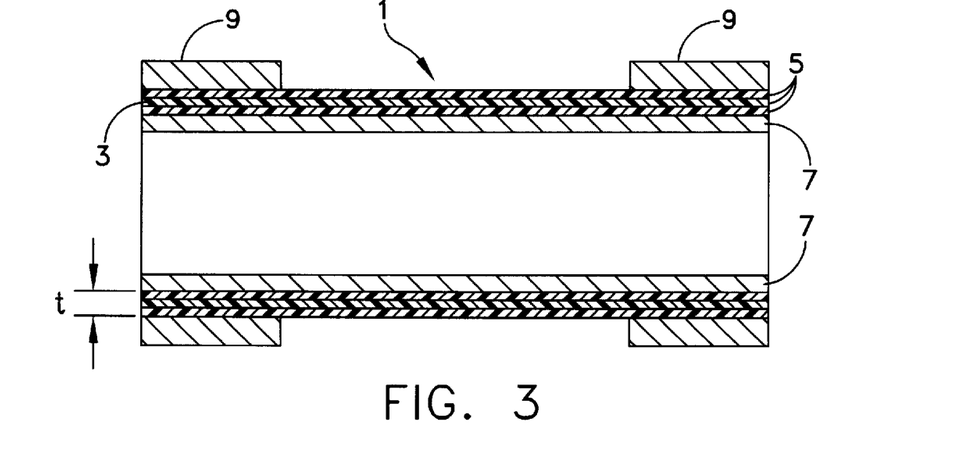
FIGS. 3 shows another article according to the invention.

FIG. 3 shows another embodiment, in which additional reinforcing sleeves 9 are included at each end of the article 1 to enhance its resistance to radial outwardly directed pressure.

Figure 4:
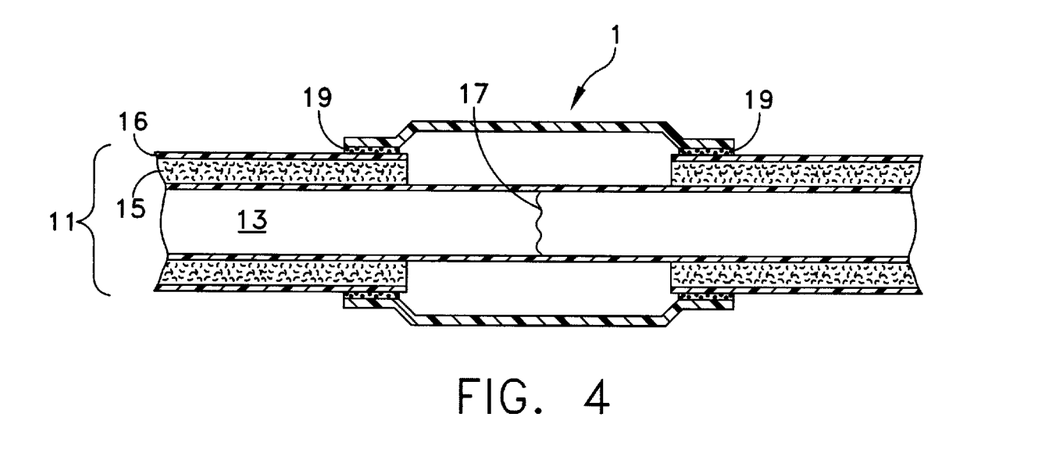
FIG. 4 and 5 show an application of the article of FIGS. 1 and 2.
Figure 5:
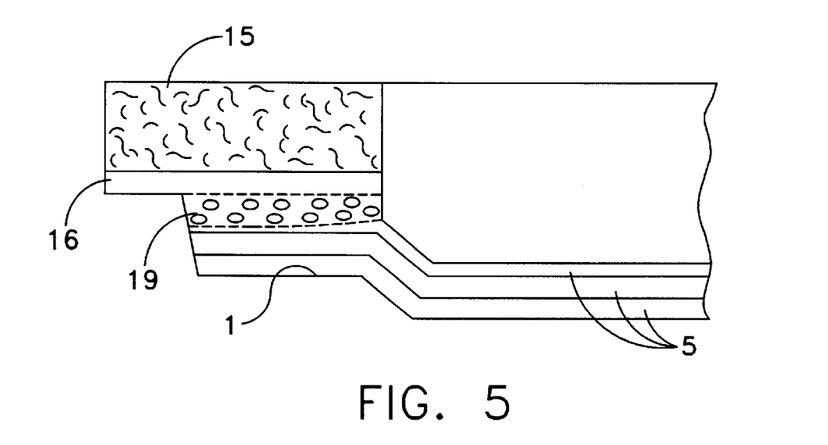

FIGS. 4 and 5 show an application of the article 1 of FIGS. 1 and 2, in combination with interface heaters 19, to form joint continuation between two thermally insulated pipes 11. Each pipe comprises a central steel pipe 13, polyurethane insulation 15 and an outer polyethylene jacket 16. The steel pipes 13 have been welded at 17, and the insulation is cut back in the weld region. Prior to the welding of pipes 13, the tubular article 1 is slipped over one of the pipes 11, then the article 1 according to the invention is positioned to bridge the cut back insulations 15. Interface heaters (e.g. resistance wire heaters 19) are also incorporated between the ends of the article 1 and the pipe jackets 16. Once the article and interface heaters 19 are correctly positioned the article is heated, e.g. by a torch, to cause it to recover, at least at its ends. The article is then allowed to cool. In the cooled article, as a result of recovery, residual hoop stresses of about 4.5 MPa are generated in the article. At this time, the interface heaters 19 are activated. At the temperature achieved at the interface by the heaters, and under the action of the residual hoop stresses in the article, a direct fusion bond is formed between the non-cross-linked layer 7 lining the article 1 and the pipe jackets 16. No externally applied pressure is needed.

Instead of, or in addition to, interface heaters 19, heat activatable adhesives may be used as a lining at the ends of the article 1. These will also form a bond between the inner surface of article 1 and the pipe jackets without the need for externally applied pressure. The adhesives may be activated by the heat applied to recover the article, or where separate interface heaters are used, by the heat supplied by the interface heater. Where adhesives are used, the separate non-cross-linked layer 7 lining the article 1 may conveniently be omitted.

Figure 6:
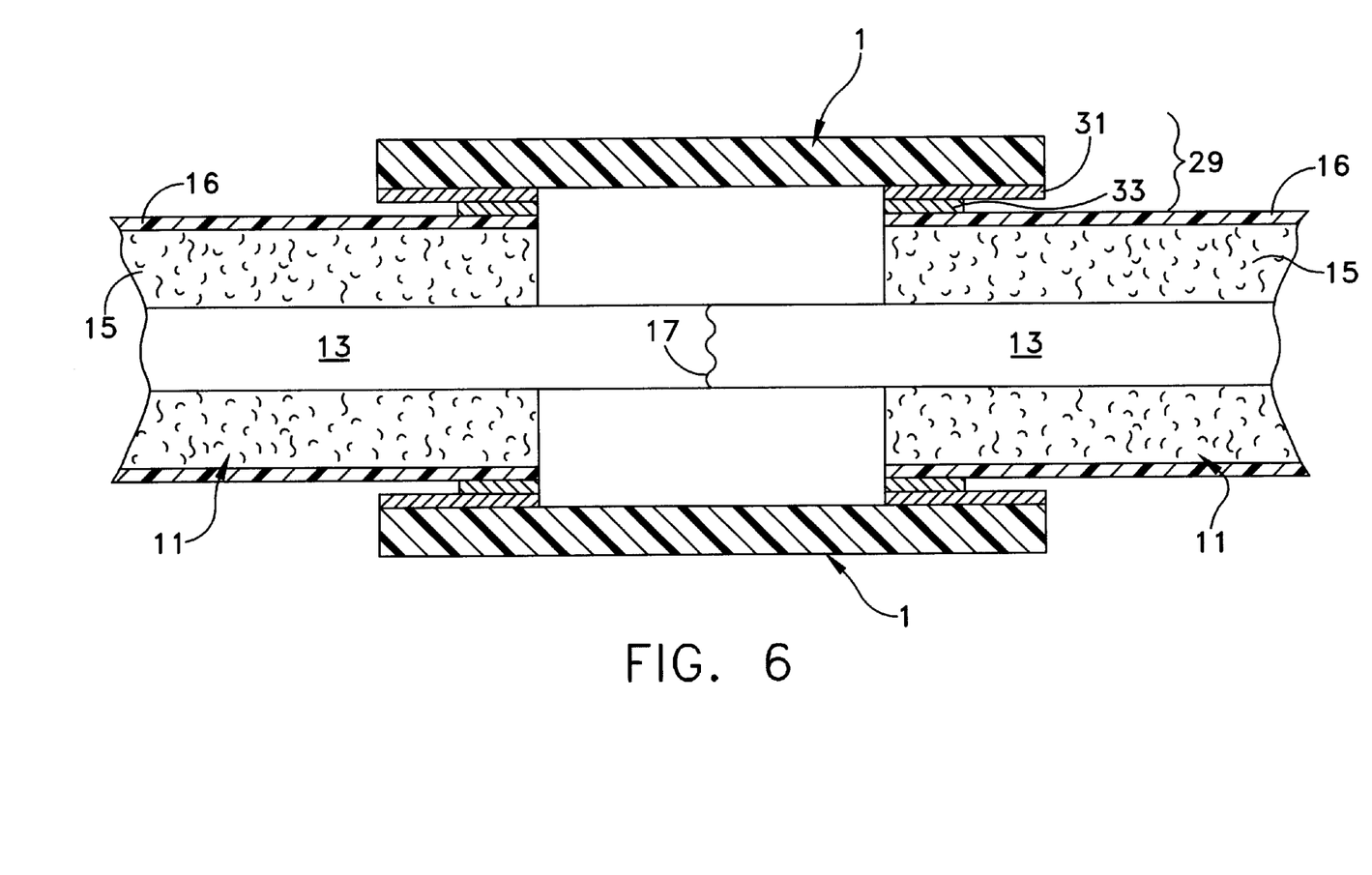
FIGS. 6, 7 and 8 show further articles, and applications thereof, according to the invention.

FIG. 6 shows an application of an article similar to that shown in FIGS. 1 and 2 (but without the non cross-linked lining layer 7) used in combination with an adhesive and mastic, to form a joint continuation between two thermally insulated pipes. The article is given the reference 1', and it is used together with a strip 29 comprising a wide tape of a hot melt adhesive 31, and a narrower tape of a mastic 33, as a casing between two thermally insulated pipes 11. In this Figure the reference numerals used for the components of the pipes are the same as those used with reference to FIGS. 4 and 5. FIG. 6 shows the arrangement prior to recovery of the article 1'.

In the arrangement of FIG. 6 the tubular article 1' is positioned over one pipe 11 prior to its connection, by welding, to the other pipe 11. The ends of cut back insulation 16 are then preferably preheated to at least 60° C., and the mastic/adhesive strip 29 wrapped around the ends of each of the cut back insulations is on the pipes 11 as shown. Then the casing is brought into position over the adhesive/mastic strips 29 as shown. The fact that the mastic 33 is inside the hot melt adhesive 31 means there is no risk of the article 1' sticking to the tacky mastic 33 in the incorrect position. Once positioned, heat is then applied to at least the ends of the article 1', by an external heat source, such as a gas torch, causing hot melt adhesive 31 to flow and bond to the pipe surfaces 16.

Figure 7:
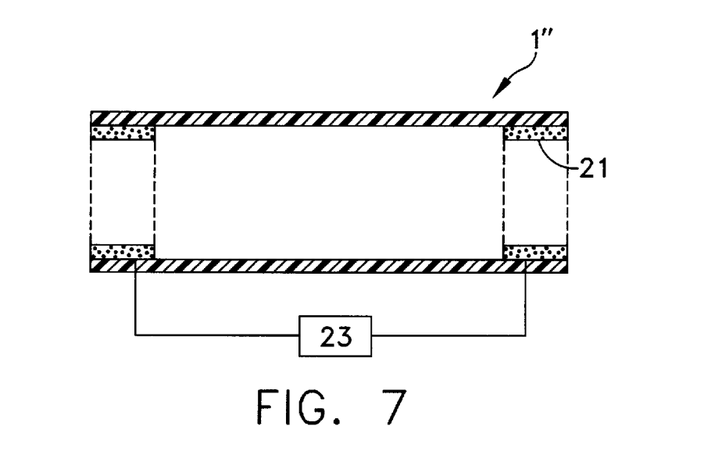

FIG. 7 shows an alternative article 1" using wrapped conductive polymeric tapes 21 of carbon-containing UHM-WPE of the type described in International Patent Publication Nos. WO88/06517 and WO89/05230 21 at the ends of the article. These may be connected to a source of electrical power 23 to cause current to flow through them to heat them. This heat may be used to shrink the ends of article 1"(or separate heating means may be used). The heat does serve to fuse the outer surface of the wrapped tapes 21 to the inner surface of article 1", and the inner surface of the wrapped tape to a substrate (not shown) placed within the article. A two stage power process may be used to effect first recovery, and then fusion.

Figure 8:
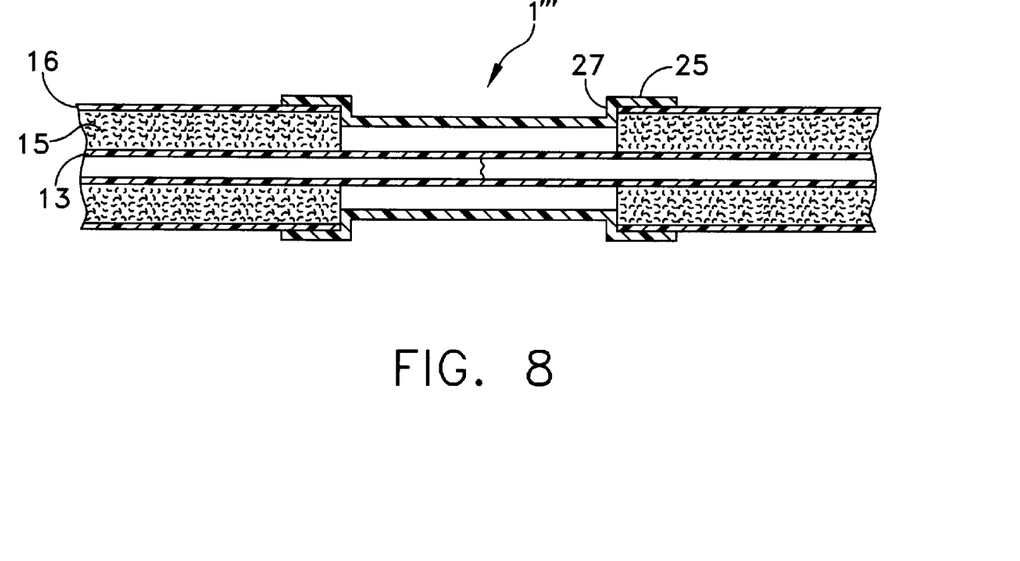

FIG. 8 shows the application of another article 1''' to form a joint continuation between thermally insulated pipes, i.e. the same application as shown in FIGS. 4, 5 and 6. In FIG. 8 like reference numerals are used to indicate like parts for the thermally insulated pipes shown in FIGS. 4 and 5. In this case the ends 25 of the article are partially recovered into the recess between cut back thermal insulations 15. The article 1''' therefore presents a vertical face transition 27 between the outer pipe jacket 16 and the recess. This provides enhanced pressure retention capability, and additional hoop stress.

Figure 9:
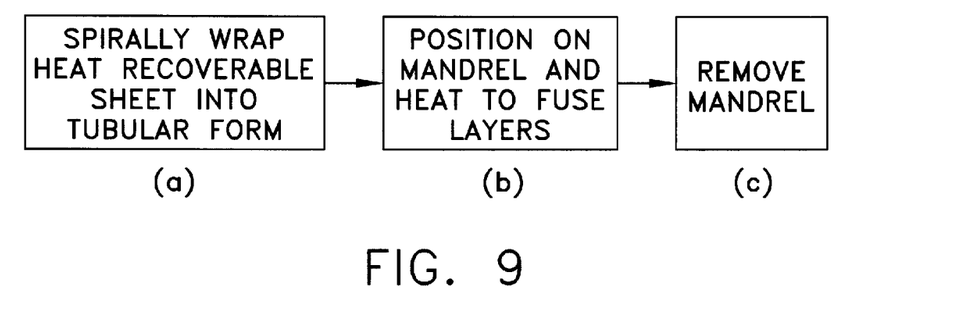
FIGS. 9 and 10 show sequential steps in two separate methods of manufacturing an article according to the invention.

FIG. 9 shows schematically the steps in a method of manufacturing an article according to the invention. In step (a) a recoverable sheet of polyethylene is spirally wrapped. In step (b) this is positioned on a mandrel, and heat applied (e.g. by an oven) to recover the sheet onto the mandrel and to fuse the layers directly to each other, and then cooled, then in step (c) the mandrel is removed. The mandrel is approximately sized so that the article formed after step (c) still has at least 3% residual recovery.

Figure 10:
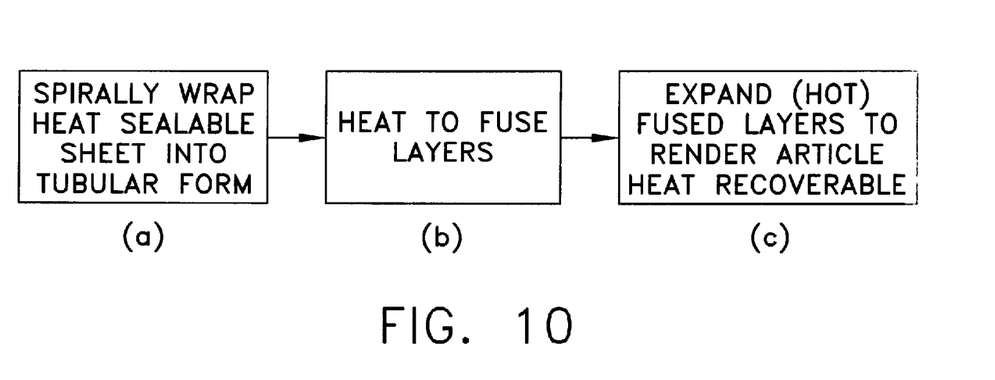

FIG. 10 shows schematically the steps in an alternative method of manufacture of an article according to the invention. In step (a) heat stable sheet is wrapped into a tubular article. In step (b) heat is applied to fuse the layers together, and in step (c) the fused layers are expanded to render the article recoverable.

What is claimed is:

1. A method of making a dimensionally heat recoverable tubular article comprising a spirally-wrapped, cross-linked polymeric sheet comprising polyethylene, overlapping layers of the cross-linked sheet having been directly fused to each other to form a consolidated tubular article, the consolidated tube having a thickness of at least 2.2 mm comprising;

(i) spirally wrapping a cross-linked, heat recoverable, polymeric sheet comprising polyethylene to form a tubular configuration comprising two or more overlapping layers of the spirally wrapped sheet;

(ii) positioning the wrapped sheet to surround a support mandrel; and (iii) heating the sheet to a temperature sufficient to cause direct fusion between the adjacent cross-linked overlapped layer of the sheet.

2. A method according to claim 1, wherein the heating step achieves a temperature which is above the recovery temperature of the polymeric sheet, whereby the sheet begins to recover and wherein the mandrel is appropriately sized to prevent full recovery of the polymeric sheet.

3. A method of making a dimensionally heat recoverable tubular article comprising a spirally-wrapped, cross-linked polymeric sheet comprising polyethylene, overlapping layers of the cross-linked sheet having been directly fused to each other to form a consolidated tubular article, the consolidated tube having a thickness of at least 2.2 mm comprising:

(i) spirally wrapping a heat stable, cross-linked, polymeric sheet comprising polyethylene to form a tubular configuration comprising two or more adjacent overlapping layers of spirally wrapped sheet;

(ii) heating the wrapped sheet to a temperature sufficient to cause fusion between the adjacent cross-linked overlapped layers of the sheet; and (iii) expanding the fused layers radially outwards, whereby the article is rendered heat recoverable.

\* \* \* \* \*